(12) United States Patent
Das et al.

(10) Patent No.: US 11,909,769 B2
(45) Date of Patent: Feb. 20, 2024

(54) TECHNOLOGIES FOR PRIVACY-PRESERVING SECURITY POLICY EVALUATION

(71) Applicant: McAfee, LLC, San Jose, CA (US)

(72) Inventors: Sudeep Das, Cupertino, CA (US); Rajesh Poornachandran, Portland, OR (US); Ned M. Smith, Beaverton, OR (US); Vincent J. Zimmer, Federal Way, WA (US); Pramod Sharma, Tanakpur (IN); Arthur Zeigler, Salem, OR (US); Sumant Vashisth, Portland, OR (US); Simon Hunt, Naples, FL (US)

(73) Assignee: MUSARUBRA US LLC, San Jose, CA (US)

( * ) Notice: Subject to any disclaimer, the term of this patent is extended or adjusted under 35 U.S.C. 154(b) by 476 days.

(21) Appl. No.: 17/153,708

(22) Filed: Jan. 20, 2021

(65) Prior Publication Data
US 2021/0168176 A1   Jun. 3, 2021

Related U.S. Application Data

(63) Continuation of application No. 16/538,434, filed on Aug. 12, 2019, now Pat. No. 10,911,496, which is a
(Continued)

(51) Int. Cl.
*H04L 9/40* (2022.01)

(52) U.S. Cl.
CPC .......... *H04L 63/20* (2013.01); *H04L 63/0227* (2013.01); *H04L 63/0428* (2013.01); *H04L 63/145* (2013.01); *G06F 2221/21* (2013.01)

(58) Field of Classification Search
CPC ...................................................... H04L 63/20
See application file for complete search history.

(56) References Cited

U.S. PATENT DOCUMENTS

| 10,169,571 | B1 * | 1/2019 | Attfield ............... G06F 21/604 |
| 10,382,489 | B2 | 8/2019 | Das et al. |
| 10,911,496 | B2 | 2/2021 | Das et al. |
| 11,102,007 | B2 * | 8/2021 | Rule ................... G06Q 20/108 |
| 11,526,745 | B2 * | 12/2022 | Sheller ................. G06N 3/063 |
| 2012/0324455 | A1 | 12/2012 | Zheng et al. |

(Continued)

FOREIGN PATENT DOCUMENTS

| CN | 102523086 | 6/2012 |
| CN | 103973646 | 8/2014 |
| CN | 108259474 | 7/2018 |
| EP | 3343873 | 7/2018 |

OTHER PUBLICATIONS

European Patent Office, "Search Report," issued in connection with European patent application No. 17211156.9, dated May 28, 2018, 8 pages.

(Continued)

*Primary Examiner* — Simon P Kanaan
(74) *Attorney, Agent, or Firm* — Hanley, Flight & Zimmerman, LLC

(57) ABSTRACT

Technologies for privacy-safe security policy evaluation are disclosed herein. An example apparatus includes at least one memory, and at least one processor to execute instructions to at least identify one or more non-sensitive parameters of a plurality of policy parameters and one or more sensitive parameters of the plurality of the policy parameters, the plurality of the policy parameters obtained from a computing device in response to a request from a cloud analytics server for the plurality of the policy parameters, encrypt the one or more sensitive parameters to generate encrypted parameter data in response to the identification of the one or more sensitive parameters, and transmit the encrypted parameter data to the cloud analytics server, the cloud analytics server to curry a security policy function based on one or more of the plurality of the policy parameters.

20 Claims, 5 Drawing Sheets

Related U.S. Application Data continuation of application No. 15/394,370, filed on Dec. 29, 2016, now Pat. No. 10,382,489.

(56) References Cited

U.S. PATENT DOCUMENTS

| | | |
|---|---|---|
| 2013/0232543 A1 | 9/2013 | Cheng et al. |
| 2015/0281279 A1 | 10/2015 | Smith et al. |
| 2018/0191780 A1* | 7/2018 | Das .................... H04L 63/145 |
| 2019/0364074 A1 | 11/2019 | Das et al. |

OTHER PUBLICATIONS

United States Patent and Trademark Office, "Non-Final Office Action," issued in connection with U.S. Appl. No. 15/394,370, dated Oct. 5, 2018, 11 pages.

United States Patent and Trademark Office, "Notice of Allowance," issued in connection with U.S. Appl. No. 15/394,370, dated Apr. 2, 2019, 9 pages.

China National Intellectual Property Administration, "First Office Action", issued in connection with Chinese Patent Application No. 201711476452.7, dated May 6, 2020, (19 pages).

China National Intellectual Property Administration, "Second Office Action", issued in connection with Chinese Patent Application No. 201711476452.7, dated Sep. 27, 2020, (10 pages).

United States Patent and Trademark Office, "Non-Final Office Action," issued in connection with U.S. Appl. No. 16/538,434, dated Jun. 12, 2020, 10 pages.

United States Patent and Trademark Office, "Notice of Allowance," issued in connection with U.S. Appl. No. 16/538,434, dated Nov. 13, 2020, 9 pages.

China National Intellectual Property Administration, "Notice of Allowance", issued in connection with Chinese Patent Application No. 201711476452.7, dated Dec. 31, 2020, (5 pages).

\* cited by examiner

TECHNOLOGIES FOR PRIVACY-PRESERVING SECURITY POLICY EVALUATION

RELATED APPLICATION

This patent arises from a continuation of U.S. patent application Ser. No. 16/538,434, (now U.S. Pat. No. 10,911, 496) which was filed on Aug. 12, 2019, which arises from a continuation of U.S. patent application Ser. No. 15/394, 370, (now U.S. Pat. No. 10,382,489) which was filed on Dec. 29, 2016. U.S. patent application Ser. No. 16/538,434 and U.S. patent application Ser. No. 15/394,370 are hereby incorporated herein by reference in their entireties. Priority to U.S. patent application Ser. No. 16/538,434 and U.S. patent application Ser. No. 15/394,370 is hereby claimed.

BACKGROUND

Detecting cyber threats such as computer viruses and other malware is an important computer security function. Cyber threat detection is increasingly being performed off-device, for example using cloud-based security monitoring services, as the logic and analysis requirements exceed available local resources. Cloud-based threat analysis typically requires all client monitoring data to be exported to a remote cloud server to be processed.

Currying is a mathematical technique of translating the evaluation of a function that takes several arguments into the evaluation of a sequence of functions that each take a single argument, called curried functions. For example, a curried function takes a single argument and returns another curried function that itself takes a single argument. Evaluation of the last function of the curried function set returns the same result as the original function.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
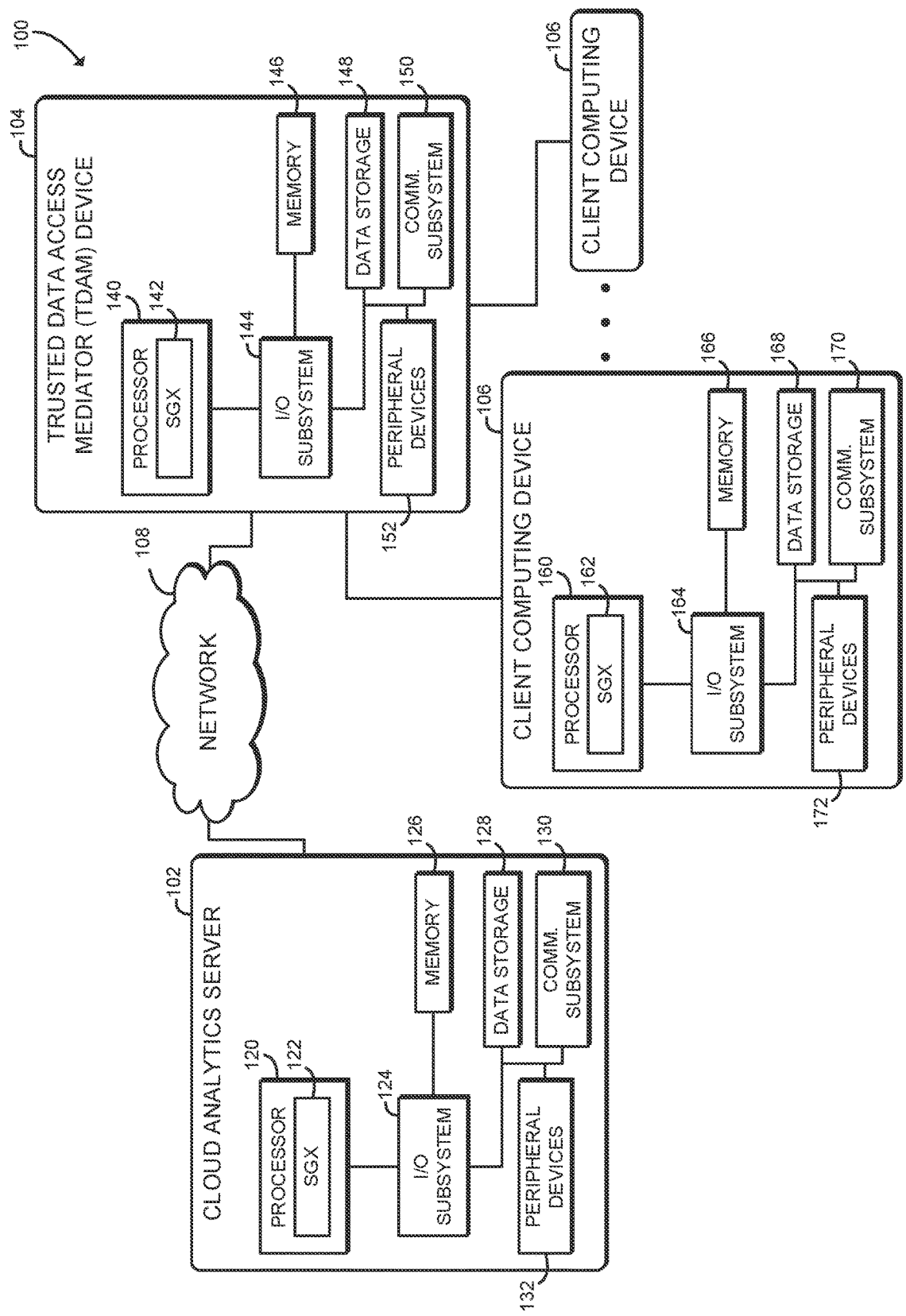
FIG. 1 is a simplified block diagram of at least one embodiment of a system for privacy-preserving security policy evaluation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for privacy-preserving security policy evaluation includes a cloud analytics server 102 in communication over a network 108 with a trusted data access mediator (TDAM) device 104 and one or more client devices 106. The TDAM device 104 and the client devices 106 may be owned or otherwise maintained by the same client entity (e.g., the same business, organization, or other enterprise) or by separate entities with a trust relationship. In many embodiments, the TDAM device 104 and the client devices 106 may be located at the same physical location or included in the same sub-network. The TDAM device 104 and the client devices 106 may also be located in different geographic locations and communication via network (not shown). In use, as described further below, the cloud analytics server 102 may evaluate a security policy function using multiple policy parameters to generate one or more security policies to be implemented by the client computing devices 106. The TDAM device 104 may transmit policy parameter data from the client computing devices 106 to the cloud analytics server 102. Certain policy parameters may be privacy-sensitive and thus the TDAM device 104 may encrypt those sensitive parameters prior to transmission to the cloud analytics server 102, which prevents the cloud analytics server 102 from accessing the clear text data of those sensitive parameters. The cloud analytics server 102 curries the security policy function to generate a set of privacy-safe curried functions and may evaluate one or more of the privacy-safe curried functions using non-sensitive parameter data (e.g., unencrypted data). The cloud analytics server 102 transmits the remaining privacy-safe curried functions and the encrypted sensitive parameter data to the client computing devices 106. The client computing devices 106 decrypt the encrypted sensitive parameter data and evaluate the remainder of the curried functions with the sensitive parameters to generate the security policies. Accordingly, the system 100 allows client entities to establish data classification policies to ensure that confidential or otherwise sensitive data is not disclosed to the cloud analytics server 102 (which may be provided by a security vendor or otherwise reside outside of the client entity's physical location or sub-network). Additionally, the system 100 maintains the ability to offload security policy decisions for scalable, efficient cloud processing while still preserving privacy.

The cloud analytics server 102 may be embodied as any type of computation or computer device capable of performing the functions described herein, including, without limitation, a computer, a multiprocessor system, a server, a rack-mounted server, a blade server, a network appliance, a distributed computing system, a processor-based system, and/or a consumer electronic device. As shown in FIG. 1, the cloud analytics server 102 illustratively include a processor 120, an input/output subsystem 124, a memory 126, a data storage device 128, and a communication subsystem 130, and/or other components and devices commonly found in a server or similar computing device. Of course, the cloud analytics server 102 may include other or additional components, such as those commonly found in a server (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

Additionally, the cloud analytics server 102 may be embodied as a single server computing device or a collection of servers and associated devices. For example, in some embodiments, the cloud analytics server 102 may be embodied as a "virtual server" formed from multiple computing devices distributed across the network 108 and operating in a public or private cloud. Accordingly, although the cloud analytics server 102 is illustrated in FIG. 1 and described below as embodied as a single server computing device, it should be appreciated that the cloud analytics server 102 may be embodied as multiple devices cooperating together to facilitate the functionality described below.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the cloud analytics server 102, such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the cloud analytics server 102. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the cloud analytics server 102, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. The communication subsystem 130 of the cloud analytics server 102 may be embodied as any communication circuit, device, or collection thereof, capable of enabling communications between the cloud analytics server 102 and other remote devices over a network. The communication subsystem 130 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the cloud analytics server 102 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

The TDAM device 104 may be embodied as any type of computation or computer device capable of performing the functions described herein, including, without limitation, a computer, a network appliance, a multiprocessor system, a server, a rack-mounted server, a blade server, a distributed computing system, a processor-based system, and/or a consumer electronic device. As shown in FIG. 1, the TDAM device 104 illustratively includes a processor 140 with secure enclave support 142, an input/output subsystem 144, a memory 146, a data storage device 148, communication subsystem 150, and peripheral devices 152. Of course, the TDAM device 104 may include other or additional components, such as those commonly found in a server (e.g., various input/output devices), in other embodiments. Those individual components of the TDAM device 104 may be similar to the corresponding components of the cloud analytics server 102, the description of which is applicable to the corresponding components of the TDAM device 104 and is not repeated herein so as not to obscure the present disclosure.

Similarly, each client computing device 106 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, a client computing device 106 illustratively includes a processor 160 with secure enclave support 162, an input/output subsystem 164, a memory 166, a data storage device 168, communication subsystem 170, and peripheral devices 172. Of course, the client computing device 106 may include other or additional components, such as those commonly found in a desktop computer (e.g., various input/output devices), in other embodiments. Those individual components of the client computing device 106 may be similar to the corresponding components of the cloud analytics server 102, the description of which is applicable to the corresponding components of the client computing device 106 and is not repeated herein so as not to obscure the present disclosure.

As discussed in more detail below, the cloud analytics server 102, the TDAM device 104 and the client computing devices 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet or RF network. As such, the network 108 may include any number of additional devices, such as additional computers, routers, and switches, to facilitate communications among the devices of the system 100.

Figure 2:
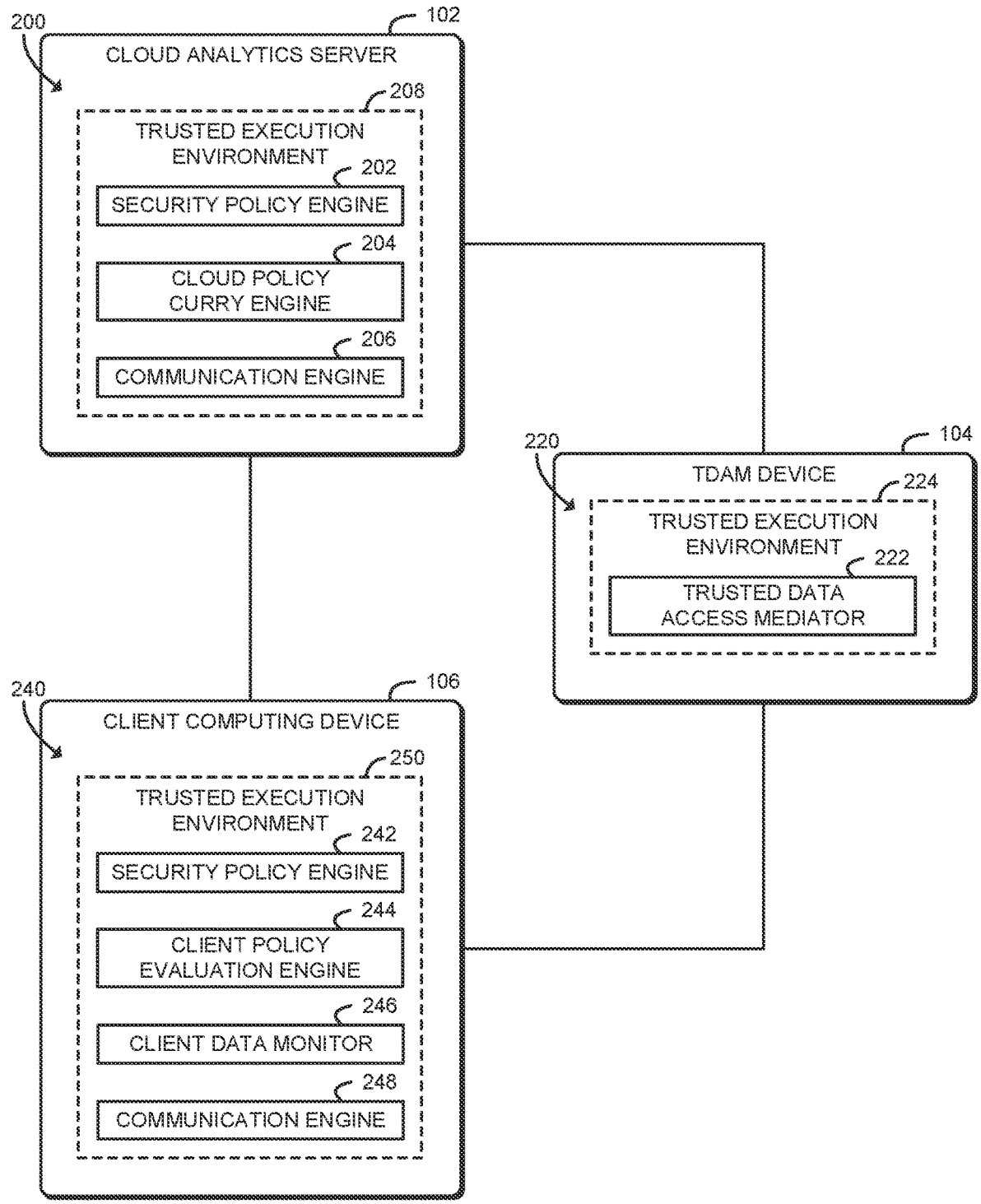
FIG. 2 is a simplified block diagram of at least one embodiment of various environments that may be established by the system of FIG. 1.

Referring now to FIG. 2, in an illustrative embodiment, the cloud analytics server 102 establishes an environment 200 during operation. The illustrative environment 200 includes a security policy engine 202, a cloud policy curry engine 204, and a communication engine 206. The various components of the environment 200 may be embodied as hardware, firmware, software, or a combination thereof. As such, in some embodiments, one or more of the components of the environment 200 may be embodied as circuitry or collection of electrical devices (e.g., security policy engine circuitry 202, cloud policy curry engine circuitry 204, and/or communication engine circuitry 206). It should be appreciated that, in such embodiments, one or more of the security policy engine circuitry 202, the cloud policy curry engine circuitry 204, and/or the communication engine circuitry 206 may form a portion of one or more of the processor 120, the I/O subsystem 124, and/or other components of the cloud analytics server 102. Additionally, in some embodiments, one or more of the illustrative components may form a portion of another component and/or one or more of the illustrative components may be independent of one another.

The security policy engine 202 is configured to determine a security policy function. The security policy function generates a security policy as a function of multiple policy parameters. The cloud policy curry engine 204 is configured to curry the security policy function to generate a privacy-safe curried function set. The privacy-safe curried function set includes one or more non-sensitive functions that each take a non-sensitive parameter of the policy parameters as an argument. The privacy-safe curried function set further includes one or more sensitive functions that each take a sensitive parameter of the policy parameters as an argument. The cloud policy curry engine 204 may be further configured to evaluate the one or more non-sensitive functions with non-sensitive parameter data to generate the one or more sensitive functions. In some embodiments, the cloud policy curry engine 204 may be further configured to receive a client data classification policy. The client data classification policy identifies the one or more non-sensitive parameters of the policy parameters and the one or more sensitive parameters of the policy parameters.

The communication engine 206 is configured to receive parameter data that corresponds to the one or more non-sensitive parameters. The parameter data is unencrypted or may be decrypted by the cloud analytics server 102. The communication engine 206 is further configured to transmit the sensitive functions of the privacy-safe curried function set to a client computing device 106. As shown in FIG. 2, the communication engine 206 may transmit the sensitive functions directly to the client computing device 106 or to the client computing device 106 via the TDAM device 104. In some embodiments, the security policy engine 202 may be further configured to negotiate the security policy generated by the security policy function with a client computing device 106 in response to transmitting the sensitive functions to the client computing device 106. In some embodiments, the communication engine 206 is configured to receive encrypted parameter data corresponding to the one or more sensitive parameters and transmit the encrypted parameter data with privacy-safe curried function set to the client computing device 106.

As shown in FIG. 2, in some embodiments the security policy engine 202, the cloud policy curry engine 204, and/or the communication engine 206 may be established by a trusted execution environment 208. The trusted execution environment 208 may be embodied as any isolated and secure execution environment within the environment 200. Code and/or data accessed by the trusted execution environment 208 may be validated and protected from unauthorized access and/or modification. In the illustrative embodiment, the trusted execution environment 208 is provided by the secure enclave support 122 of the processor 120, which provides a secure enclave that establishes a secure execution environment that is protected from other software and/or hardware executed by the cloud analytics server 102. Additionally or alternatively, in other embodiments the trusted execution environment 208 may be provided with an ARM® TrustZone® secure world, a converged security and manageability engine (CSME), or other secure environment.

Still referring to FIG. 2, in the illustrative embodiment, the TDAM device 104 establishes an environment 220 during operation. The illustrative environment 220 includes a trusted data access mediator 222. The various components of the environment 220 may be embodied as hardware, firmware, software, or a combination thereof. As such, in some embodiments, one or more of the components of the environment 220 may be embodied as circuitry or collection of electrical devices (e.g., trusted data access mediator circuitry 222). It should be appreciated that, in such embodiments, the trusted data access mediator circuitry 222 may form a portion of one or more of the processor 140, the I/O subsystem 144, and/or other components of the TDAM device 104. Additionally, in some embodiments, one or more of the illustrative components may form a portion of another component and/or one or more of the illustrative components may be independent of one another.

The trusted data access mediator 222 is configured to receive a request for parameter data from the cloud analytics server 102 and collect the parameter data from one or more client computing devices 106. The trusted data access mediator 222 is configured to identify sensitive parameter data and non-sensitive parameter data based on a client data classification policy. The client data classification policy identifies one or more non-sensitive parameters and one or more sensitive parameters out of multiple policy parameters. The trusted data access mediator 222 is further configured to encrypt the sensitive parameter data to generate encrypted parameter data and to transmit the encrypted parameter data to the cloud analytics server 102. In some embodiments, the trusted data access mediator 222 may be configured to transmit the non-sensitive parameter data to the cloud analytics server 102. In some embodiments, the trusted data access mediator 222 may be further configured to determine the client data classification policy.

As shown in FIG. 2, in some embodiments the trusted data access mediator 222 may be established by a trusted execution environment 224. The trusted execution environment 224 may be embodied as any isolated and secure execution environment within the environment 220. Code and/or data accessed by the trusted execution environment 224 may be validated and protected from unauthorized access and/or modification. In the illustrative embodiment, the trusted execution environment 224 is provided by the secure enclave support 142 of the processor 140, which provides a secure enclave that establishes a secure execution environment that is protected from other software and/or hardware executed by the TDAM device 104. Additionally or alternatively, in other embodiments the trusted execution environment 224 may be provided with an ARM® TrustZone® secure world, a converged security and manageability engine (CSME), or other secure environment.

Still referring to FIG. 2, in the illustrative embodiment, a client computing device 106 establishes an environment 240 during operation. The illustrative environment 240 includes a security policy engine 242, a client policy evaluation engine 244, a client data monitor 246, and a communication engine 248. The various components of the environment 240 may be embodied as hardware, firmware, software, or a combination thereof. As such, in some embodiments, one or more of the components of the environment 240 may be embodied as circuitry or collection of electrical devices (e.g., security policy engine circuitry 242, client policy evaluation engine circuitry 244, client data monitor circuitry 246, and/or communication engine circuitry 248). It should be appreciated that, in such embodiments, one or more of the security policy engine circuitry 242, the client policy evaluation engine circuitry 244, the client data monitor circuitry 246, and/or the communication engine circuitry 248 may form a portion of one or more of the processor 160, the I/O subsystem 164, and/or other components of the client computing device 106. Additionally, in some embodiments, one or more of the illustrative components may form a portion of another component and/or one or more of the illustrative components may be independent of one another.

The communication engine 248 is configured to receive, from the cloud analytics server 102, one or more sensitive functions of a privacy-safe curried function set. The one or more sensitive functions each take a sensitive parameter of multiple policy parameters as an argument. The communication engine 248 is further configured to receive encrypted parameter data that corresponds to the one or more sensitive parameters of policy parameters. The sensitive functions and the encrypted parameter data may be received from the cloud analytics server 102 and/or the TDAM device 104.

The client policy evaluation engine 244 is configured to decrypt the encrypted parameter data to generate the one or more sensitive parameters, and to evaluate the one or more sensitive functions with the one or more sensitive parameters to generate a security policy. The security policy engine 242 may be configured to enforce the security policy in response evaluating of the one or more sensitive functions. In some embodiments, the security policy engine 242 may be configured to negotiate the security policy with the cloud analytics server 102 in response to evaluating the one or more sensitive functions. The client data monitor 246 may be configured to transmit parameter data to the TDAM device 104.

As shown in FIG. 2, in some embodiments the security policy engine 242, the client policy evaluation engine 244, the client data monitor 246, and/or the communication engine 248 may be established by a trusted execution environment 250. The trusted execution environment 250 may be embodied as any isolated and secure execution environment within the environment 240. Code and/or data accessed by the trusted execution environment 250 may be validated and protected from unauthorized access and/or modification. In the illustrative embodiment, the trusted execution environment 250 is provided by the secure enclave support 162 of the processor 160, which provides a secure enclave that establishes a secure execution environment that is protected from other software and/or hardware executed by the client computing device 106. Additionally or alternatively, in other embodiments the trusted execution environment 250 may be provided with an ARM® TrustZone® secure world, a converged security and manageability engine (CSME), or other secure environment.

Figure 3:
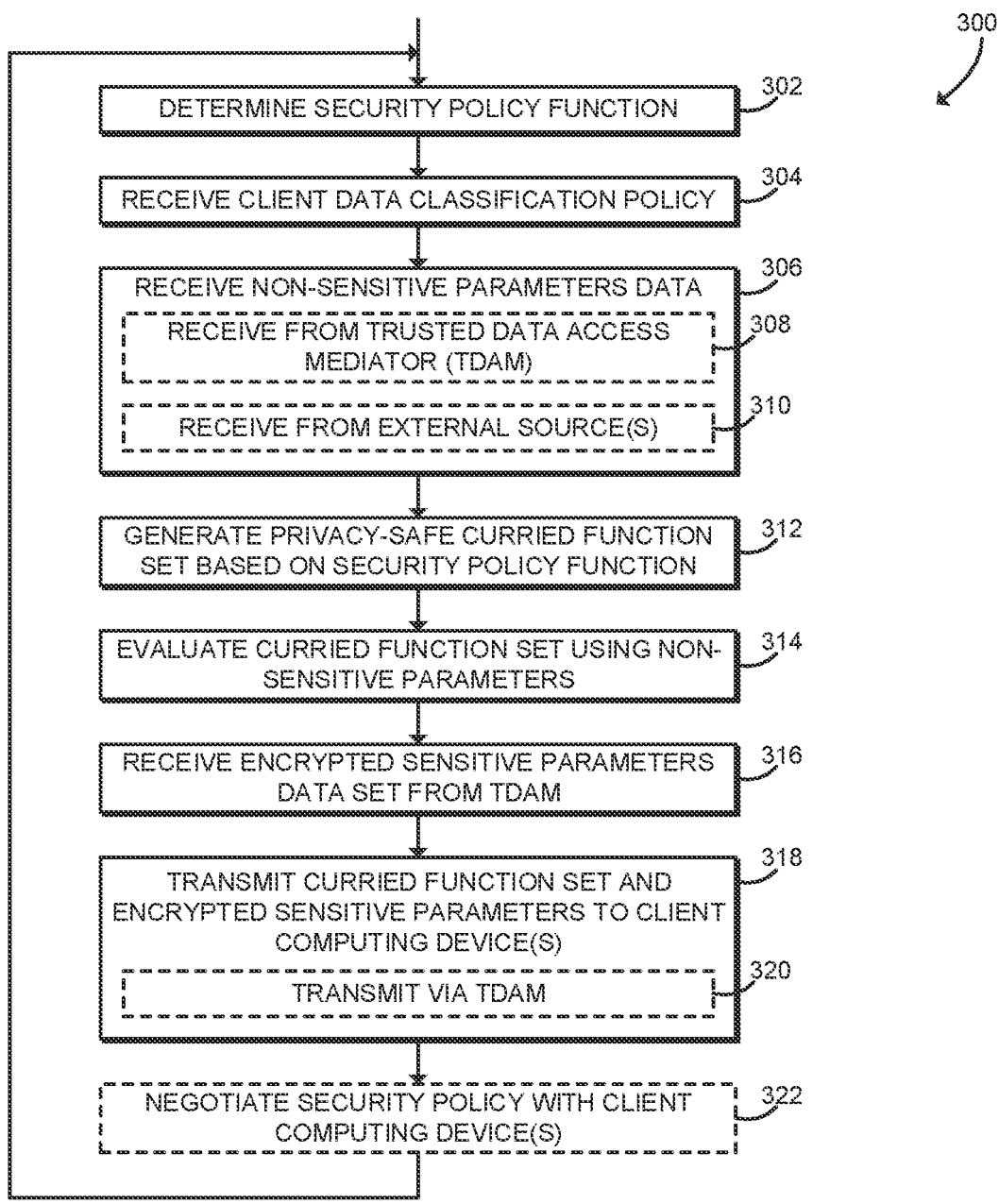
FIG. 3 is a simplified flow diagram of at least one embodiment of a method for privacy-preserving security policy evaluation that may be executed by a cloud analytics server of FIGS. 1-2.

Referring now to FIG. 3, in use, the cloud analytics server 102 may execute a method 300 for privacy-preserving security policy evaluation. It should be appreciated that, in some embodiments, the operations of the method 300 may be performed by one or more components of the environment 200 of the cloud analytics server 102 as shown in FIG. 2. In particular, in some embodiments the code and/or data processed by the method 300 may be verified and/or protected from unauthorized access by the trusted execution environment 208. Additionally or alternatively, it should be appreciated that, in some embodiments, the method 300 may be embodied as various instructions stored on a computer-readable media, which may be executed by the processor 120, the I/O subsystem 124, and/or other components of the cloud analytics server 102 to cause the cloud analytics server 102 to perform the method 300. The computer-readable media may be embodied as any type of media capable of being read by the cloud analytics server 102 including, but not limited to, the memory 126, the data storage device 128, firmware devices, and/or other media.

The method 300 begins in block 302, in which the cloud analytics server 102 determines a security policy function. The security policy function may be embodied as any function that determines one or more security policies based on one or more input policy parameters. For example, the security function may be embodied as an expression consisting of a finite-state automata (FSA) that implements a state-machine containing an analytics workload such as a differential privacy analysis, machine learning system such as a Gaussian process regression, Bayesian network, case-based reasoning, group method of data handling (GMDH) and/or inductive logic programing. As described further below, the security function may be embodied as a serialization of one or more of the above analytics algorithms that is curried for evaluation/execution by the client computing devices 106. The policy parameters may include both global and local (client-specific) telemetry information, threat feeds, or other data relating to potential security threats. For example, the policy parameters may include data related to the user, the client node (e.g., node name or network address), the network, geographic location, threat category, threat manifestation, or other threat data (e.g., malware name, files, context about a task being performed by the client device, etc.). The security policies determined by the security policy function may include threat remediation settings, actions, rules, or other policies. For example, security policies may include whether network access is allowed, a heuristic level for a client antivirus engine, whether to allow access to a file identified with a particular hash value, or other threat remediation or prevention policies.

In block 304, the cloud analytics server 102 receives a client data classification policy. The client data classification policy may be received, for example, from the TDAM device 104 or other device owned or managed by a client entity. The client data classification policy identifies certain policy parameters (or classes of policy parameters) that are considered to be sensitive by the associated client entity. For example, the client data classification policy may identify sensitive parameters such as financial information, protected health information, individually identifiable information (e.g., user name, IP address, or other information), or other sensitive data. Such sensitive policy parameters may not be removed in an unencrypted format from the network or other facilities of the client entity. Thus, sensitive policy parameters may not be accessed by the cloud analytics server 102 in an unencrypted format. Because each client entity may specify its own client data classification policy, the privacy-preserving security policy evaluation of the cloud analytics server 102 may be scalable for any data classification and any number of classifications. In some embodiments, the client data classification policy may also identify non-sensitive policy parameters that may be communicated to or otherwise accessed by the cloud analytics server 102 in an unencrypted format. Additionally or alternatively, in some embodiments, all policy parameters or other data classes not identified as sensitive may be considered to be non-sensitive.

To illustrate the client data classification policy, consider a security policy function $V(\{C1, \ldots, Cn\}) \rightarrow Policy$. In this notation, the security policy function V is a function that takes a set of arguments C as policy parameters and produces a security policy. A client data classification policy may identify a certain subset of C (e.g., $\{C1, \ldots, Ci\}$), as sensitive parameters S and another subset of C (e.g., $\{Ci+1, \ldots, Cn\}$) as non-sensitive (or public) parameters P. Thus, the security policy function V may be rewritten in terms of sensitive parameters S and non-sensitive parameters P as $V(\{P\}, \{S\}) \rightarrow Policy$.

In block 306, the cloud analytics server 102 receives the non-sensitive parameters data. The cloud analytics server 102 is capable of accessing the non-sensitive parameters in unencrypted form, for example by receiving the non-sensitive parameters in clear text or by decrypting the non-sensitive parameters. In some embodiments, in block 308 the cloud analytics server 102 may receive the non-sensitive parameters data from the TDAM device 104. For example, the TDAM device 104 may collect data from one or more client computing devices 106 or otherwise collect data related to the client network or client location. The TDAM device 104 may provide data to the cloud analytics server 102 in response to a request for data from the cloud analytics server 102. In some embodiments, in block 310, the cloud analytics server 102 may receive the non-sensitive parameters data from one or more external sources. For example, the cloud analytics server 102 may receive the non-sensitive data from a global threat monitoring service or other threat data feed.

In block 312, the cloud analytics server 102 generates a privacy-safe curried function set based on the security policy function and the client data classification policy. Currying is a mathematical technique of translating evaluation of a function with multiple arguments into a evaluating a sequence of functions, each with a single argument. Each curried function is supplied a single parameter and returns as a result the next curried function in the sequence, up to the last curried function, which returns the result of the original function. Thus, by currying the security policy function, the evaluation of non-sensitive parameters may be separated from the evaluation of sensitive parameters. The cloud analytics server 102 may use any technique to generate the privacy-safe curried function set, for example using features of a functional programming language such as Haskell. Additionally, depending on the embodiment the cloud analytics server 102 may generate the first curried function in the sequence of curried function set, the entire set of curried functions, or any other subset of the curried functions.

To illustrate, consider again the security policy function $V(\{P\}, \{S\}) \rightarrow Policy$, where P are non-sensitive parameters and S are sensitive parameters. The function V may be curried into the set of functions $F1(P1) \rightarrow F2(P2) \rightarrow \ldots \rightarrow Fi(Pi) \rightarrow G1(S1) \rightarrow \ldots \rightarrow Gj(Sj) \rightarrow Policy$. That is, evaluating the function F1 with the non-sensitive parameter P1 returns the function F2, evaluating the function F2 with the non-sensitive parameter P2 returns another function F and so on up to the function Fi. Evaluating the function Fi with the non-sensitive parameter Pi returns a function G1 which takes the sensitive parameter S1 as argument. Evaluating the function G1 with the sensitive parameter S1 returns another function G, and so on up to the function Gj. Evaluating the function Gj with the sensitive parameters Sj returns the same policies returned by the original security policy function V. For clarity, the privacy-safe curried function set may be rewritten as $F(\{P1, \ldots, Pi\}) \rightarrow G(\{S1, \ldots, Sj\}) \rightarrow Policy$; that is, as a function F that takes the non-sensitive parameters P as arguments and returns the function G, which takes the sensitive parameters S as arguments and returns the security policy.

In block 314, the cloud analytics server 102 evaluates the privacy-safe curried function set using the non-sensitive parameters. As described above, the curried function set includes a series of functions that each take a non-sensitive parameter as an argument and return the next function in the sequence as the result. The cloud analytics server 102 may sequentially evaluate all of the curried functions that take non-sensitive policy parameters as arguments. The cloud analytics server 102 generates as a result another curried function (or set of curried functions) that takes a sensitive parameter as an argument. For example, continuing the illustration described above, the cloud analytics server 102 may evaluate all of the functions F with the corresponding non-sensitive parameter P. The cloud analytics server 102 does not evaluate any curried function that takes a sensitive parameter as an argument. For example, the cloud analytics server 102 does not evaluate any of the functions G that take a sensitive parameter S as argument.

In block 316, the cloud analytics server 102 receives one or more encrypted sensitive parameters from the TDAM device 104. The sensitive parameters may be collected, for example, from one or more of the client computing devices 106 and encrypted by the TDAM device 104. The sensitive parameters data is encrypted and inaccessible to the cloud analytics server 102. For example, the sensitive parameters data may be encrypted with a secret key known only to the TDAM device 104 and/or the client computing devices 106. The TDAM device 104 may provide data to the cloud analytics server 102 in response to a request for data from the cloud analytics server 102. One potential embodiment of a method executed by the TDAM 104 to provide the encrypted sensitive parameters is described below in connection with FIG. 4.

In block 318, the cloud analytics server 102 transmits the privacy safe curried function set and the encrypted sensitive parameters to one or more client computing devices 106. As described further below, the client computing devices 106 may decrypt the encrypted sensitive parameters and use the decrypted sensitive parameters to evaluate the curried function set to generate the security policies. The cloud analytics server 102 may transmit the curried function set and the encrypted sensitive parameters in any appropriate format that allows the client computing device 106 to perform those functions. In particular, the cloud analytics server 102 may transfer the privacy safe curried function set after evaluation with the non-sensitive policy parameters, which may allow certain computation to be performed by the cloud analytics server 102 and not by the client computing devices 106. For example, the cloud analytics server 102 may transmit a representation of one or more curried functions G that may each be evaluated with a corresponding sensitive parameter S. Depending on the embodiment, the cloud analytics server 102 may transmit only the first curried function that accepts a sensitive parameter as argument (e.g., G1), and/or the cloud analytics server 102 may also transmit other curried functions G. In some embodiments, the cloud analytics server 102 may select or otherwise customize the encrypted sensitive parameter data for a particular client computing device 106, which may allow for better tailoring of the generated security policies to the client computing device 106. In some embodiments, in block 320 the cloud analytics server 102 may transmit the privacy safe curried function set and the encrypted sensitive parameters to the client computing devices 106 via the TDAM device 104.

In some embodiments, in block 322 the cloud analytics server 102 may negotiate the security policy with one or more client computing devices 106. For example, as described further below, after evaluating the curried function set and generating one or more security policies, a client computing device 106 may determine a preferred security policy and send a proposal of the preferred security policy to the cloud analytics server 102. The cloud analytics server 102 may evaluate the proposed security policy and, if acceptable, may allow the client computing device 106 to use the proposed security policy. In some embodiments, the cloud analytics server 102 may update the security policy function based on the proposed security policy, for example by updating one or more machine learning parameters. Thus, the cloud analytics server 102 may improve the quality of the security policies generated by the security policy function based on the response of client computing devices 106 that are in use. Additionally or alternatively, although illustrated as negotiating with the client computing device 106, in some embodiments the cloud analytics server 102 may negotiate the security policy with the TDAM device 104, which may act as a proxy for one or more client computing devices 106. After transmitting the privacy safe curried function set and the encrypted sensitive parameters (and in some embodiments, after negotiating the security policy), the method 300 loops back to block 302 to continue performing security policy evaluation.

Figure 4:
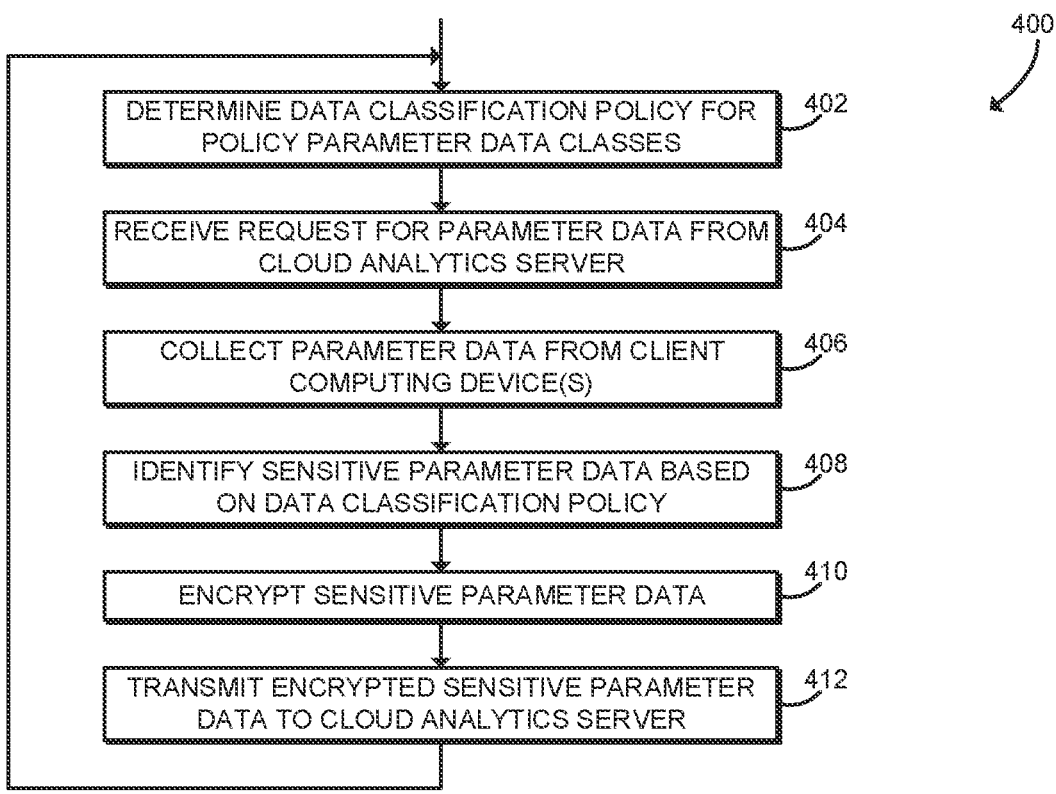
FIG. 4 is a simplified flow diagram of at least one embodiment of a method for privacy-preserving security policy evaluation that may be executed by a trusted data access mediator device of FIGS. 1-2.

Referring now to FIG. 4, in use, the TDAM device 104 may execute a method 400 for privacy-preserving security policy evaluation. It should be appreciated that, in some embodiments, the operations of the method 400 may be performed by one or more components of the environment 220 of the TDAM device 104 as shown in FIG. 2. In particular, in some embodiments the code and/or data processed by the method 400 may be verified and/or protected from unauthorized access by the trusted execution environment 224. Additionally or alternatively, it should be appreciated that, in some embodiments, the method 400 may be embodied as various instructions stored on a computer-readable media, which may be executed by the processor 140, the I/O subsystem 144, and/or other components of the TDAM device 104 to cause the TDAM device 104 to perform the method 400. The computer-readable media may be embodied as any type of media capable of being read by the TDAM device 104 including, but not limited to, the memory 146, the data storage device 148, firmware devices, and/or other media.

The method 400 begins in block 402, in which the TDAM device 104 determines a data classification policy for policy parameter data classes. As described above in connection with block 304 of FIG. 3, the data classification policy identifies certain policy parameters (or classes of policy parameters) that are considered to be sensitive by the associated client entity. For example, the data classification policy may identify sensitive parameters such as financial information, protected health information, individually identifiable information (e.g., user name, IP address, or other information), or other sensitive data. Such sensitive policy parameters may not be removed in an unencrypted format from the network or other facilities of the client entity. Thus, the TDAM device 104 may ensure that such sensitive policy parameters may not leave a client network or other client facility in unencrypted form. In some embodiments, the data classification policy may also identify non-sensitive policy parameters that may be communicated by the TDAM device 104 in an unencrypted format. Additionally or alternatively, in some embodiments, all policy parameters or other data classes not identified as sensitive may be considered to be non-sensitive.

In block 404, the TDAM device 104 receives a request for policy parameter data from the cloud analytics server 102. The request may identify particular data items, data classes, or other data that may be used to evaluate a security policy function to generate one or more security policies. In block 406, the TDAM device 104 collects parameter data from one or more client computing devices 106. The TDAM device 104 may, for example, collect particular data classes requested by the cloud analytics server 102. The TDAM device 104 is trusted by the client entity and, as described above, may be located within the client entity sub-network or physical location. Thus, the TDAM device 104 may access both sensitive and non-sensitive parameter data.

In block 408, the TDAM device 104 identifies sensitive parameter data based on the data classification policy. For example, the TDAM device 104 may identify sensitive parameters such as financial information, protected health information, individually identifiable information (e.g., user name, IP address, or other information), or other sensitive data identified in the data classification policy. In block 410, the TDAM device 104 encrypts the sensitive parameter data. The TDAM device 104 may encrypt the sensitive parameter data so that it may not be accessed by the cloud analytics server 102 but may be accessed by one or more client computing devices 106, for example by encrypting with a secret key shared only by the TDAM device 104 and the corresponding client computing device 106. The secret key may be, for example, provisioned to both the TDAM device 104 and the client computing device 106 in an out-of-band fashion, for example during manufacture.

In block 412, the TDAM device 104 transmits the encrypted sensitive parameter data to the cloud analytics server 102. As described above in connection with FIG. 3, the cloud analytics server 102 may transmit the encrypted sensitive parameter data, along with one or more corresponding privacy safe curried functions, to one or more client computing devices 106 for evaluation. It should be understood that in some embodiments the TDAM device 104 may also transmit the non-sensitive parameter data to the cloud analytics server 102 in an unencrypted or otherwise accessible format. After transmitting the encrypted sensitive parameter data, the method 400 loops back to block 402 to continue collecting and transmitting the parameter data.

Figure 5:
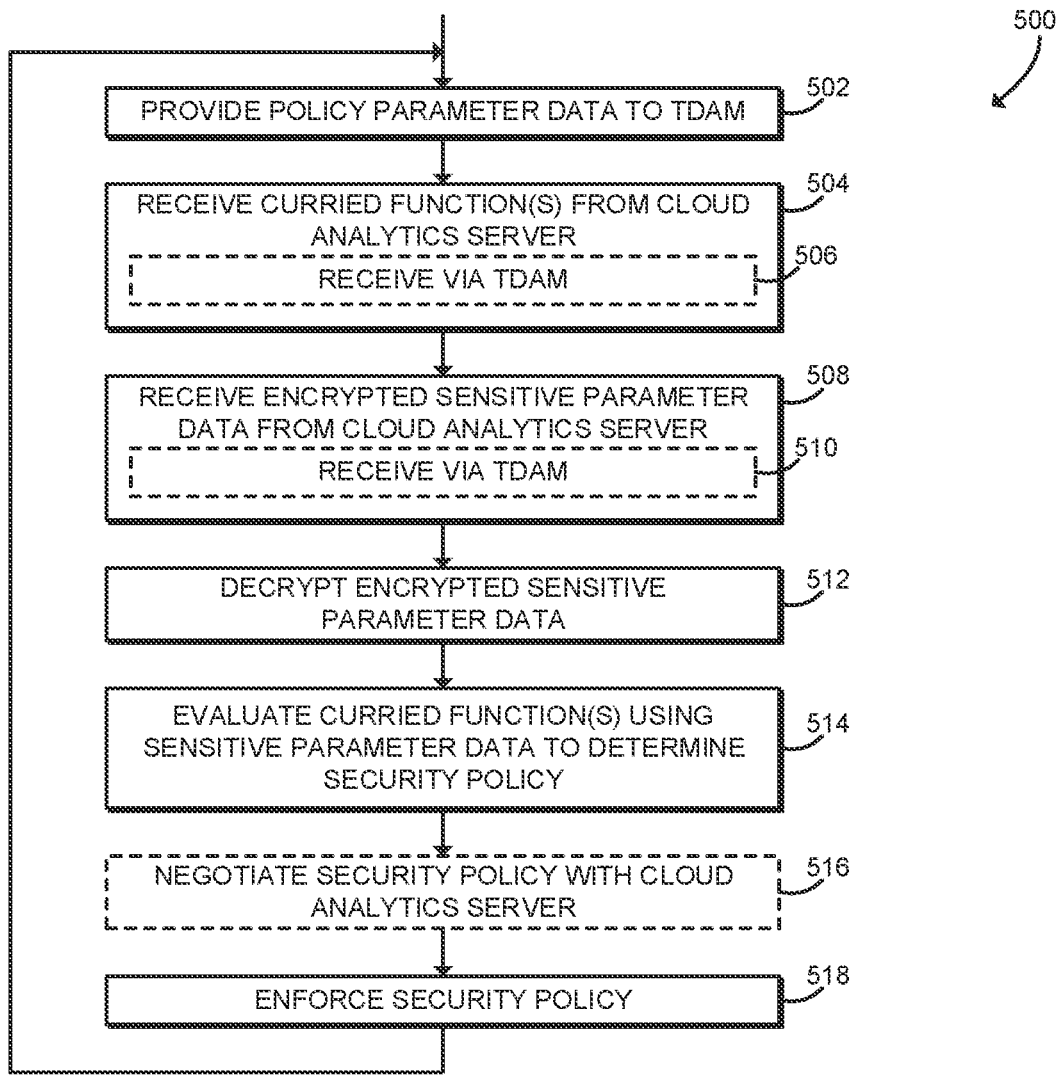
FIG. 5 is a simplified flow diagram of at least one embodiment of a method for privacy-preserving security policy evaluation that may be executed by a client computing device of FIGS. 1-2.

Referring now to FIG. 5, in use, a client computing device 106 may execute a method 500 for privacy-preserving security policy evaluation. It should be appreciated that, in some embodiments, the operations of the method 500 may be performed by one or more components of the environment 240 of the client computing device 106 as shown in FIG. 2. In particular, in some embodiments the code and/or data processed by the method 500 may be verified and/or protected from unauthorized access by the trusted execution environment 250. Additionally or alternatively, it should be appreciated that, in some embodiments, the method 500 may be embodied as various instructions stored on a computer-readable media, which may be executed by the processor 160, the I/O subsystem 164, and/or other components of the client computing device 106 to cause the client computing device 106 to perform the method 500. The computer-readable media may be embodied as any type of media capable of being read by the client computing device 106 including, but not limited to, the memory 166, the data storage device 168, firmware devices, and/or other media.

The method 500 begins in block 502, in which the client computing device 106 may provide policy parameter data to the TDAM device 104. As described above, the client computing device 106 may provide any information that may be used for a security threat evaluation, including telemetry data, network data, threat manifestations, threat category, or other threat information. The policy parameter data provided by the client computing device 106 may include both sensitive parameter data and non-sensitive parameter data.

In block 504, the client computing device 106 receives one or more curried functions from the cloud analytics server 102. As described above in connection with FIG. 3, a privacy-safe curried function set is generated by the cloud analytics server 102 based on a security policy function and a client data classification policy applicable to the client computing device 106. Each curried function is supplied a single parameter and returns as a result the next curried function in the sequence, up to the last curried function, which returns the result of the original function. As described above, the cloud analytics server 102 evaluates the curried functions that take non-sensitive parameters as arguments and may transmit the curried functions that take sensitive parameters as arguments to the client computing device 106. For example, for the curried function set F({P1, . . . , Pi})→G({S1, . . . , Sj})→Policy, the client computing device 106 may receive the function G({S1, . . . , Sj})→Policy (and/or an equivalent set of functions G1 to Gj and/or a function G1 that may be evaluated to generate the remaining curried functions). In some embodiments, in block 506 the client computing device 106 may receive the curried functions from the cloud analytics server 102 via the TDAM device 104.

In block 508, the client computing device 106 receives one or more encrypted sensitive parameters from the cloud analytics server 102. For example, the client computing device 106 may receive encrypted values for the sensitive parameters S1 to Sj of the previous example. The encrypted sensitive parameters may have been originally generated by the client computing device 106 or by some other device (e.g. another client computing device 106 managed by the same client entity). In some embodiments, in block 510 the client computing device 106 may receive the encrypted sensitive parameters from the cloud analytics server 102 via the TDAM device 104.

In block 512, the client computing device 106 decrypts the encrypted sensitive parameters. The client computing device 106 may decrypt the encrypted sensitive parameters using, for example, a secret key shared with the TDAM device 104. As described above, the secret key may be, for example, provisioned to both the TDAM device 104 and the client computing device 106 in an out-of-band fashion, for example during manufacture.

In block 514, the client computing device 106 evaluates the curried functions using the decrypted sensitive parameter data to determine one or more security policies. As described above, the curried function set includes a series of functions that each take a sensitive parameter as an argument and return the next function in the sequence as the result. The client computing device 106 may sequentially evaluate all of the curried functions that take sensitive policy parameters as arguments. The result of evaluating the last curried function is the one or more security policies that would be generated by the security policy function. For example, continuing the illustration described above, the client computing device 106 may evaluate all of the functions G with the corresponding sensitive parameter S. The client computing device 106 may not need to evaluate any curried function that takes a non-sensitive parameter as an argument, as those evaluations were performed by the cloud analytics server 102. Evaluation of the last function Gj with the last sensitive parameter Sj returns the resulting security policies.

In some embodiments, in block 516 the client computing device 106 may negotiate the security policy with the cloud analytics server 102. For example, after evaluating the curried function set and generating one or more security policies, the client computing device 106 may select or otherwise determine a preferred security policy. The client computing device 106 may send a proposal of the preferred security policy to the cloud analytics server 102. The cloud analytics server 102 may evaluate the proposed security policy and, if acceptable, may respond to allow the client computing device 106 to use the proposed security policy.

In block 518, the client computing device 106 enforces the one or more security policies generated as described above. As described above, the security policies may include threat remediation settings, actions, rules, or other policies. For example, based on the security policies, the client computing device 106 may allow or disallow network access, adjust a heuristic level for a client antivirus engine, allow or disallow access to a file identified with a particular hash value, or enforce other threat remediation or prevention policies. After enforcing the security policy, the method 500 loops back to block 502 to continue evaluating and enforcing security policies.

EXAMPLES

Illustrative examples of the technologies disclosed herein are provided below. An embodiment of the technologies may include any one or more, and any combination of, the examples described below.

Example 1 includes a computing device for privacy-safe cloud threat analysis, the computing device comprising: a cloud policy curry engine to curry a security policy function to generate a privacy-safe curried function set, wherein the security policy function generates a security policy as a function of a plurality of policy parameters, wherein the privacy-safe curried function set includes one or more non-sensitive functions that each take a non-sensitive parameter of the plurality of policy parameters as an argument, and wherein the privacy-safe curried function set further includes one or more sensitive functions that each take a sensitive parameter of the plurality of policy parameters as an argument; and a communication engine to receive parameter data that corresponds to one or more non-sensitive parameters of the plurality of policy parameters, wherein the parameter data is unencrypted; wherein the cloud policy curry engine is further to evaluate the one or more non-sensitive functions of the privacy-safe curried function set with the parameter data to generate the one or more sensitive functions; and wherein the communication engine is further to transmit the sensitive functions of the privacy-safe curried function set to a client computing device.

Example 2 includes the subject matter of Example 1, and wherein the cloud policy curry engine is further to receive a client data classification policy, wherein the client data classification policy identifies the one or more non-sensitive parameters of the plurality of policy parameters and one or more sensitive parameters of the plurality of policy parameters.

Example 3 includes the subject matter of any of Examples 1 and 2, and wherein further comprising a security policy engine to determine the security policy function, wherein the security policy function generates a security policy as a function of the plurality of policy parameters.

Example 4 includes the subject matter of any of Examples 1-3, and wherein the communication engine is further to (i) receive encrypted parameter data corresponding to the one or more sensitive parameters and (ii) transmit the encrypted parameter data to the client computing device.

Example 5 includes the subject matter of any of Examples 1-4, and wherein to receive the parameter data comprises to receive the parameter data from a trusted data access mediator device.

Example 6 includes the subject matter of any of Examples 1-5, and wherein to receive the parameter data comprises to receive the parameter data from an external data source.

Example 7 includes the subject matter of any of Examples 1-6, and wherein to transmit the sensitive functions comprises to transmit the sensitive functions to the client device via a trusted data access mediator device.

Example 8 includes the subject matter of any of Examples 1-7, and further comprising a security policy engine to negotiate the security policy generated by the security policy function with the client computing device in response to transmission of the sensitive functions to the client computing device.

Example 9 includes the subject matter of any of Examples 1-8, and further comprising a trusted execution environment, wherein the trusted execution environment comprises the cloud policy curry engine and the communication engine.

Example 10 includes the subject matter of any of Examples 1-9, and wherein the trusted execution environment comprises a secure enclave established by secure enclave support of a processor of the computing device.

Example 11 includes a computing device for privacy-safe cloud threat analysis, the computing device comprising a trusted data access mediator to: receive a request for parameter data from a cloud analytics server; collect the parameter data from one or more client computing devices in response to receipt of the request for the parameter data; identify sensitive parameter data of the parameter data and non-sensitive parameter data of the parameter data based on a client data classification policy, wherein the client data classification policy identifies one or more non-sensitive parameters of a plurality of policy parameters and one or more sensitive parameters of a plurality of policy parameters; encrypt the sensitive parameter data to generate encrypted parameter data in response to identification of the sensitive parameter data; and transmit the encrypted parameter data to the cloud analytics server.

Example 12 includes the subject matter of Example 11, and wherein the trusted data access mediator is further to determine the client data classification policy.

Example 13 includes the subject matter of any of Examples 11 and 12, and wherein the trusted data access mediator is further to transmit the non-sensitive parameter data to the cloud analytics server in response to identification of the non-sensitive parameter data.

Example 14 includes the subject matter of any of Examples 11-13, and further comprising a trusted execution environment, wherein the trusted execution environment comprises the trusted data access mediator.

Example 15 includes the subject matter of any of Examples 11-14, and wherein the trusted execution environment comprises a secure enclave established by secure enclave support of a processor of the computing device.

Example 16 includes the subject matter of any of Examples 11-15, and wherein the trusted data access mediator is further to negotiate a security policy with the cloud analytics server in response to transmission of the encrypted parameter data to the cloud analytics server.

Example 17 includes a computing device for privacy-safe cloud threat analysis, the computing device comprising: a communication engine to (i) receive, from a cloud analytics server, one or more sensitive functions of a privacy-safe curried function set, wherein the one or more sensitive functions each take a sensitive parameter of a plurality of policy parameters as an argument, and (ii) receive encrypted parameter data that corresponds to the one or more sensitive parameters of the plurality of policy parameters; and a client policy evaluation engine to (i) decrypt the encrypted parameter data to generate the one or more sensitive parameters, and (ii) evaluate the one or more sensitive functions with the one or more sensitive parameters to generate a security policy.

Example 18 includes the subject matter of Example 17, and wherein to receive the one or more sensitive functions comprises to receive the one or more sensitive functions via a trusted data access mediator device.

Example 19 includes the subject matter of any of Examples 17 and 18, and wherein to receive the encrypted parameter data comprises to receive the encrypted parameter data from the cloud analytics server.

Example 20 includes the subject matter of any of Examples 17-19, and wherein to receive the encrypted parameter data comprises to receive the encrypted parameter data from a trusted data access mediator device.

Example 21 includes the subject matter of any of Examples 17-20, and further comprising a security policy engine to negotiate the security policy with the cloud analytics server in response to evaluation of the one or more sensitive functions.

Example 22 includes the subject matter of any of Examples 17-21, and further comprising a security policy engine to enforce the security policy in response to evaluation of the one or more sensitive functions.

Example 23 includes the subject matter of any of Examples 17-22, and further comprising a client data monitor to transmit parameter data to a trusted data access mediator device.

Example 24 includes the subject matter of any of Examples 17-23, and further comprising a trusted execution environment, wherein the trusted execution environment comprises the communication engine and the client policy evaluation engine.

Example 25 includes the subject matter of any of Examples 17-24, and wherein the trusted execution environment comprises a secure enclave established by secure enclave support of a processor of the computing device.

Example 26 includes a method for privacy-safe cloud threat analysis, the method comprising: currying, by a computing device, a security policy function to generate a privacy-safe curried function set, wherein the security policy function generates a security policy as a function of a plurality of policy parameters, wherein the privacy-safe curried function set includes one or more non-sensitive functions that each take a non-sensitive parameter of the plurality of policy parameters as an argument, and wherein the privacy-safe curried function set further includes one or more sensitive functions that each take a sensitive parameter of the plurality of policy parameters as an argument; receiving, by the computing device, parameter data corresponding to one or more non-sensitive parameters of the plurality of policy parameters, wherein the parameter data is unencrypted; evaluating, by the computing device, the one or more non-sensitive functions of the privacy-safe curried function set with the parameter data to generate the one or more sensitive functions; and transmitting, by the computing device, the sensitive functions of the privacy-safe curried function set to a client computing device.

Example 27 includes the subject matter of Example 26, and further comprising receiving, by the computing device, a client data classification policy, wherein the client data classification policy identifies the one or more non-sensitive parameters of the plurality of policy parameters and one or more sensitive parameters of the plurality of policy parameters.

Example 28 includes the subject matter of any of Examples 26 and 27, and further comprising determining, by the computing device, the security policy function, wherein the security policy function generates a security policy as a function of the plurality of policy parameters.

Example 29 includes the subject matter of any of Examples 26-28, and further comprising: receiving, by the computing device, encrypted parameter data corresponding to the one or more sensitive parameters; and transmitting, by the computing device, the encrypted parameter data to the client computing device.

Example 30 includes the subject matter of any of Examples 26-29, and wherein receiving the parameter data comprises receiving the parameter data from a trusted data access mediator device.

Example 31 includes the subject matter of any of Examples 26-30, and wherein receiving the parameter data comprises receiving the parameter data from an external data source.

Example 32 includes the subject matter of any of Examples 26-31, and wherein transmitting the sensitive functions comprises transmitting the sensitive functions to the client device via a trusted data access mediator device.

Example 33 includes the subject matter of any of Examples 26-32, and further comprising negotiating, by the computing device, the security policy generated by the security policy function with the client computing device in response to transmitting the sensitive functions to the client computing device.

Example 34 includes the subject matter of any of Examples 26-33, and wherein: currying the security policy function comprises currying the security policy function by a trusted execution environment of the computing device; receiving the parameter data comprises receiving the parameter data by the trusted execution environment; evaluating the one or more non-sensitive functions of the privacy-safe curried function set comprises evaluating the one or more non-sensitive functions of the privacy-safe curried function set by the trusted execution environment; and transmitting the sensitive functions comprises transmitting the sensitive functions by the trusted execution environment.

Example 35 includes the subject matter of any of Examples 26-34, and wherein the trusted execution environment comprises a secure enclave established by secure enclave support of a processor of the computing device.

Example 36 includes a method for privacy-safe cloud threat analysis, the method comprising: receiving, by a computing device, a request for parameter data from a cloud analytics server; collecting, by the computing device, the parameter data from one or more client computing devices in response to receiving the request for the parameter data; identifying, by the computing device, sensitive parameter data of the parameter data and non-sensitive parameter data of the parameter data based on a client data classification policy, wherein the client data classification policy identifies one or more non-sensitive parameters of a plurality of policy parameters and one or more sensitive parameters of a plurality of policy parameters; encrypting, by the computing device, the sensitive parameter data to generate encrypted parameter data in response to identifying the sensitive parameter data; and transmitting, by the computing device, the encrypted parameter data to the cloud analytics server.

Example 37 includes the subject matter of Example 36, and further comprising determining, by the computing device, the client data classification policy.

Example 38 includes the subject matter of any of Examples 36 and 37, and further comprising transmitting, by the computing device, the non-sensitive parameter data to the cloud analytics server in response to identifying the non-sensitive parameter data.

Example 39 includes the subject matter of any of Examples 36-38, and wherein: receiving the request for parameter data comprises receiving the request for parameter data by a trusted execution environment of the computing device; collecting the parameter data comprises collecting the parameter data by the trusted execution environment; identifying the sensitive parameter data comprises identifying the sensitive parameter data by the trusted execution environment; encrypting the sensitive parameter data comprises encrypting the sensitive parameter data by the trusted execution environment; and transmitting the encrypted parameter data comprises transmitting the encrypted parameter data by the trusted execution environment.

Example 40 includes the subject matter of any of Examples 36-39, and wherein the trusted execution environment comprises a secure enclave established by secure enclave support of a processor of the computing device.

Example 41 includes the subject matter of any of Examples 36-40, and further comprising negotiating, by the computing device, a security policy with the cloud analytics server in response to transmitting the encrypted parameter data to the cloud analytics server.

Example 42 includes a method for privacy-safe cloud threat analysis, the method comprising: receiving, by a computing device from a cloud analytics server, one or more sensitive functions of a privacy-safe curried function set, wherein the one or more sensitive functions each take a sensitive parameter of a plurality of policy parameters as an argument; receiving, by the computing device, encrypted parameter data corresponding to the one or more sensitive parameters of the plurality of policy parameters; decrypting, by the computing device, the encrypted parameter data to generate the one or more sensitive parameters; and evaluating, by the computing device, the one or more sensitive functions with the one or more sensitive parameters to generate a security policy.

Example 43 includes the subject matter of Example 42, and wherein receiving the one or more sensitive functions comprises receiving the one or more sensitive functions via a trusted data access mediator device.

Example 44 includes the subject matter of any of Examples 42 and 43, and wherein receiving the encrypted parameter data comprises receiving the encrypted parameter data from the cloud analytics server.

Example 45 includes the subject matter of any of Examples 42-44, and wherein receiving the encrypted parameter data comprises receiving the encrypted parameter data from a trusted data access mediator device.

Example 46 includes the subject matter of any of Examples 42-45, and further comprising negotiating, by the computing device, the security policy with the cloud analytics server in response to evaluating the one or more sensitive functions.

Example 47 includes the subject matter of any of Examples 42-46, and further comprising enforcing, by the computing device, the security policy in response to evaluating the one or more sensitive functions.

Example 48 includes the subject matter of any of Examples 42-47, and further comprising transmitting, by the computing device, parameter data to a trusted data access mediator device.

Example 49 includes the subject matter of any of Examples 42-48, and wherein: receiving the one or more sensitive functions comprises receiving the one or more sensitive functions by a trusted execution environment of the computing device; receiving the encrypted parameter data comprises receiving the encrypted parameter data by the trusted execution environment; decrypting the encrypted parameter data comprises decrypting the encrypted parameter data by the trusted execution environment; and evaluating the one or more sensitive functions comprises evaluating the one or more sensitive functions by the trusted execution environment.

Example 50 includes the subject matter of any of Examples 42-49, and wherein the trusted execution environment comprises a secure enclave established by secure enclave support of a processor of the computing device.

Example 51 includes a computing device comprising: a processor; and a memory having stored therein a plurality of instructions that when executed by the processor cause the computing device to perform the method of any of Examples 26-50.

Example 52 includes one or more machine readable storage media comprising a plurality of instructions stored thereon that in response to being executed result in a computing device performing the method of any of Examples 26-50.

Example 53 includes a computing device comprising means for performing the method of any of Examples 26-50.

Example 54 includes a computing device for privacy-safe cloud threat analysis, the computing device comprising: means for currying a security policy function to generate a privacy-safe curried function set, wherein the security policy function generates a security policy as a function of a plurality of policy parameters, wherein the privacy-safe curried function set includes one or more non-sensitive functions that each take a non-sensitive parameter of the plurality of policy parameters as an argument, and wherein the privacy-safe curried function set further includes one or more sensitive functions that each take a sensitive parameter of the plurality of policy parameters as an argument; means for receiving parameter data corresponding to one or more non-sensitive parameters of the plurality of policy parameters, wherein the parameter data is unencrypted; means for evaluating the one or more non-sensitive functions of the privacy-safe curried function set with the parameter data to generate the one or more sensitive functions; and means for transmitting the sensitive functions of the privacy-safe curried function set to a client computing device.

Example 55 includes the subject matter of Example 54, and further comprising means for receiving a client data classification policy, wherein the client data classification policy identifies the one or more non-sensitive parameters of the plurality of policy parameters and one or more sensitive parameters of the plurality of policy parameters.

Example 56 includes the subject matter of any of Examples 54 and 55, and further comprising means for determining the security policy function, wherein the security policy function generates a security policy as a function of the plurality of policy parameters.

Example 57 includes the subject matter of any of Examples 54-56, and further comprising: means for receiving encrypted parameter data corresponding to the one or more sensitive parameters; and means for transmitting the encrypted parameter data to the client computing device.

Example 58 includes the subject matter of any of Examples 54-57, and wherein the means for receiving the parameter data comprises means for receiving the parameter data from a trusted data access mediator device.

Example 59 includes the subject matter of any of Examples 54-58, and wherein the means for receiving the parameter data comprises means for receiving the parameter data from an external data source.

Example 60 includes the subject matter of any of Examples 54-59, and wherein the means for transmitting the sensitive functions comprises means for transmitting the sensitive functions to the client device via a trusted data access mediator device.

Example 61 includes the subject matter of any of Examples 54-60, and further comprising means for negotiating the security policy generated by the security policy function with the client computing device in response to transmitting the sensitive functions to the client computing device.

Example 62 includes the subject matter of any of Examples 54-61, and wherein: the means for currying the security policy function comprises means for currying the security policy function by a trusted execution environment of the computing device; the means for receiving the parameter data comprises means for receiving the parameter data by the trusted execution environment; the means for evaluating the one or more non-sensitive functions of the privacy-safe curried function set comprises means for evaluating the one or more non-sensitive functions of the privacy-safe curried function set by the trusted execution environment; and the means for transmitting the sensitive functions comprises means for transmitting the sensitive functions by the trusted execution environment.

Example 63 includes the subject matter of any of Examples 54-62, and wherein the trusted execution environment comprises a secure enclave established by secure enclave support of a processor of the computing device.

Example 64 includes a computing device for privacy-safe cloud threat analysis, the computing device comprising: means for receiving a request for parameter data from a cloud analytics server; means for collecting the parameter data from one or more client computing devices in response to receiving the request for the parameter data; means for identifying sensitive parameter data of the parameter data and non-sensitive parameter data of the parameter data based on a client data classification policy, wherein the client data classification policy identifies one or more non-sensitive parameters of a plurality of policy parameters and one or more sensitive parameters of a plurality of policy parameters; means for encrypting the sensitive parameter data to generate encrypted parameter data in response to identifying the sensitive parameter data; and means for transmitting the encrypted parameter data to the cloud analytics server.

Example 65 includes the subject matter of Example 64, and further comprising means for determining the client data classification policy.

Example 66 includes the subject matter of any of Examples 64 and 65, and further comprising means for transmitting the non-sensitive parameter data to the cloud analytics server in response to identifying the non-sensitive parameter data.

Example 67 includes the subject matter of any of Examples 64-66, and wherein: the means for receiving the request for parameter data comprises means for receiving the request for parameter data by a trusted execution environment of the computing device; the means for collecting the parameter data comprises means for collecting the parameter data by the trusted execution environment; the means for identifying the sensitive parameter data comprises means for identifying the sensitive parameter data by the trusted execution environment; the means for encrypting the sensitive parameter data comprises means for encrypting the sensitive parameter data by the trusted execution environment; and the means for transmitting the encrypted parameter data comprises means for transmitting the encrypted parameter data by the trusted execution environment.

Example 68 includes the subject matter of any of Examples 64-67, and wherein the trusted execution environment comprises a secure enclave established by secure enclave support of a processor of the computing device.

Example 69 includes the subject matter of any of Examples 64-68, and further comprising means for negotiating a security policy with the cloud analytics server in response to transmitting the encrypted parameter data to the cloud analytics server.

Example 70 includes a computing device for privacy-safe cloud threat analysis, the computing device comprising: means for receiving, from a cloud analytics server, one or more sensitive functions of a privacy-safe curried function set, wherein the one or more sensitive functions each take a sensitive parameter of a plurality of policy parameters as an argument; means for receiving encrypted parameter data corresponding to the one or more sensitive parameters of the plurality of policy parameters; means for decrypting the encrypted parameter data to generate the one or more sensitive parameters; and means for evaluating the one or more sensitive functions with the one or more sensitive parameters to generate a security policy.

Example 71 includes the subject matter of Example 70, and wherein the means for receiving the one or more sensitive functions comprises means for receiving the one or more sensitive functions via a trusted data access mediator device.

Example 72 includes the subject matter of any of Examples 70 and 71, and wherein the means for receiving the encrypted parameter data comprises means for receiving the encrypted parameter data from the cloud analytics server.

Example 73 includes the subject matter of any of Examples 70-72, and wherein the means for receiving the encrypted parameter data comprises means for receiving the encrypted parameter data from a trusted data access mediator device.

Example 74 includes the subject matter of any of Examples 70-73, and further comprising means for negotiating the security policy with the cloud analytics server in response to evaluating the one or more sensitive functions.

Example 75 includes the subject matter of any of Examples 70-74, and further comprising means for enforcing the security policy in response to evaluating the one or more sensitive functions.

Example 76 includes the subject matter of any of Examples 70-75, and further comprising means for transmitting parameter data to a trusted data access mediator device.

Example 77 includes the subject matter of any of Examples 70-76, and wherein: the means for receiving the one or more sensitive functions comprises means for receiving the one or more sensitive functions by a trusted execution environment of the computing device; the means for receiving the encrypted parameter data comprises means for receiving the encrypted parameter data by the trusted execution environment; the means for decrypting the encrypted parameter data comprises means for decrypting the encrypted parameter data by the trusted execution environment; and the means for evaluating the one or more sensitive functions comprises means for evaluating the one or more sensitive functions by the trusted execution environment.

Example 78 includes the subject matter of any of Examples 70-77, and wherein the trusted execution environment comprises a secure enclave established by secure enclave support of a processor of the computing device.

What is claimed is:

1. An apparatus for performing privacy-safe cloud threat analysis, the apparatus comprising:
    at least one memory; and
    at least one processor to execute instructions to at least:
        identify one or more non-sensitive parameters of a plurality of policy parameters and one or more sensitive parameters of the plurality of the policy parameters, the plurality of the policy parameters obtained from a computing device in response to a request from a cloud analytics server for the plurality of the policy parameters;
        encrypt the one or more sensitive parameters to generate encrypted parameter data in response to the identification of the one or more sensitive parameters;
        analyze the encrypted parameter data to determine whether to apply a security policy to the encrypted parameter data;
        select a security policy from one or more security policies based on whether to apply the security policy to the encrypted parameter data, the selection of the security policy further based on whether the security policy meets an acceptance threshold;
        transmit the encrypted parameter data to the cloud analytics server, the cloud analytics server to curry a security policy function based on one or more of the plurality of the policy parameters; and
        request use of the security policy by the cloud analytics server subsequent to the transmission of the encrypted parameter data to the cloud analytics server.

2. The apparatus of claim 1, wherein the at least one processor is to execute ones of the instructions in a trusted execution environment, the trusted execution environment including a secure enclave established by secure enclave support of the at least one processor.

3. The apparatus of claim 1, wherein the at least one processor is to transmit the one or more non-sensitive parameters to the cloud analytics server in response to the identification of the one or more non-sensitive parameters.

4. The apparatus of claim 1, wherein the at least one processor is to generate the one or more security policies for which to select the security policy.

5. The apparatus of claim 1, wherein the cloud analytics server is a virtual server.

6. The apparatus of claim 1, wherein the one or more sensitive parameters include data associated with at least one of financial information, protected health information, or individually identifiable information, the individually identifiable information including at least one of a user name or an Internet Protocol address, and the at least one processor is to:
    determine a data classification policy based on at least one of the financial information, the protected health information, or the individually identifiable information; and
    identify at least one of (i) the one or more non-sensitive parameters or (ii) the one or more sensitive parameters based on the data classification policy.

7. The apparatus of claim 1, wherein the at least one processor is to:
    obtain a privacy-safe curried function set from the cloud analytics server, the privacy-safe curried function set including one or more first functions and one or more second functions, the one or more first functions having a respective non-sensitive parameter of the one or more non-sensitive parameters as respective first arguments, the one or more second functions having a respective sensitive parameter of the one or more sensitive parameters as respective second arguments; and
    provide at least one of (i) the one or more first functions or (ii) the one or more second functions to the computing device.

8. The apparatus of claim 7, wherein the privacy-safe curried function is generated in response to the cloud analytics server currying the security policy function, the cloud analytics server to curry the security policy function in response to obtaining the encrypted parameter data from the at least one processor.

9. A machine readable storage medium comprising instructions that, when executed, cause at least one processor to at least:
    identify one or more non-sensitive parameters of a plurality of policy parameters and one or more sensitive parameters of the plurality of the policy parameters, the plurality of the policy parameters obtained from a computing device in response to a request from a cloud analytics server for the plurality of the policy parameters;
    encrypt the one or more sensitive parameters to generate encrypted parameter data in response to the identification of the one or more sensitive parameters;
    analyze the encrypted parameter data to determine whether to apply a security policy to the encrypted parameter data;
    select a security policy from one or more security policies based on whether to apply the security policy to the encrypted parameter data, the selection of the security policy further based on whether the security policy meets an acceptance threshold;
    transmit the encrypted parameter data to the cloud analytics server, the cloud analytics server to curry a security policy function based on one or more of the plurality of the policy parameters; and
    request use of the security policy by the cloud analytics server subsequent to the transmission of the encrypted parameter data to the cloud analytics server.

10. The machine readable storage medium of claim 9, wherein the instructions, when executed, cause the at least one processor to execute ones of the instructions in a trusted execution environment, the trusted execution environment including a secure enclave established by secure enclave support of the at least one processor.

11. The machine readable storage medium of claim 9, wherein the instructions, when executed, cause the at least one processor to transmit the one or more non-sensitive parameters to the cloud analytics server in response to the identification of the one or more non-sensitive parameters.

12. The machine readable storage medium of claim 9, wherein the instructions, when executed, cause the at least one processor to generate the one or more security policies for which to select the security policy.

13. The machine readable storage medium of claim 9, wherein the one or more sensitive parameters include data associated with at least one of financial information, protected health information, or individually identifiable information, the individually identifiable information including at least one of a user name or an Internet Protocol address, and the instructions, when executed, cause the at least one processor to:
- determine a data classification policy based on at least one of the financial information, the protected health information, or the individually identifiable information; and
- identify at least one of (i) the one or more non-sensitive parameters or (ii) the one or more sensitive parameters based on the data classification policy.

14. The machine readable storage medium of claim 9, wherein the instructions, when executed, cause the at least one processor to:
- obtain a privacy-safe curried function set from the cloud analytics server, the privacy-safe curried function set including one or more first functions and one or more second functions, the one or more first functions having a respective non-sensitive parameter of the one or more non-sensitive parameters as respective first arguments, the one or more second functions having a respective sensitive parameter of the one or more sensitive parameters as respective second arguments; and
- provide at least one of (i) the one or more first functions or (ii) the one or more second functions to the computing device.

15. The machine readable storage medium of claim 14, wherein the privacy-safe curried function is generated in response to the cloud analytics server currying the security policy function, the cloud analytics server to curry the security policy function in response to obtaining the encrypted parameter data from the at least one processor.

16. A method for privacy-safe cloud threat analysis, the method comprising:
- accessing one or more functions of a privacy-safe curried function set, the one or more functions to take a respective sensitive parameter of a plurality of policy parameters as an argument;
- accessing encrypted parameter data that corresponds to one or more sensitive parameters of the plurality of policy parameters;
- decrypting the encrypted parameter data to generate the one or more sensitive parameters;
- analyzing the encrypted parameter data to determine whether to apply a security policy to the encrypted parameter data;
- selecting a security policy from one or more security policies based on whether to apply the security policy to the encrypted parameter data, the selection of the security policy further based on whether the security policy meets an acceptance threshold; and
- requesting use of the security policy by a cloud analytics server subsequent to a transmission of the encrypted parameter data to the cloud analytics server.

17. The method of claim 16, wherein the encrypted parameter data is accessed from at least one of a cloud analytics server or a trusted data access mediator device.

18. The method of claim 16, further including:
- generating the one or more security policies for which to select the security policy; and
- enforcing the security policy.

19. The method of claim 16, wherein at least one of the accessing of the one or more functions, the accessing of the encrypted parameter data, the decrypting of the encrypted parameter data, or evaluating of the one or more functions is executed in a trusted execution environment.

20. The method of claim 19, wherein the trusted execution environment includes a secure enclave established by secure enclave support of at least one processor.

\* \* \* \* \*